United States Patent
Dillinger et al.

(10) Patent No.: US 12,162,379 B2
(45) Date of Patent: Dec. 10, 2024

(54) SEAT ASSEMBLY

(71) Applicants: Adient US LLC, Plymouth, MI (US); Kostal Automobil Elektrik GmbH & Co. KG, Lüdenscheid (DE)

(72) Inventors: Thomas Dillinger, Ratingen (DE); Christian Schirp, Bochum (DE)

(73) Assignees: Adient US LLC, Plymouth, MI (US); Kostal Automobil Elektrik GmbH & Co. KG, Ludenscheid (DE)

( * ) Notice: Subject to any disclaimer, the term of this patent is extended or adjusted under 35 U.S.C. 154(b) by 329 days.

(21) Appl. No.: 17/753,566

(22) PCT Filed: Sep. 9, 2020

(86) PCT No.: PCT/EP2020/075198
§ 371 (c)(1),
(2) Date: Mar. 8, 2022

(87) PCT Pub. No.: WO2021/048206
PCT Pub. Date: Mar. 18, 2021

(65) Prior Publication Data
US 2022/0371475 A1    Nov. 24, 2022

(30) Foreign Application Priority Data
Sep. 9, 2019    (DE) ................. 10 2019 213 665.6

(51) Int. Cl.
*B60N 2/02*    (2006.01)
*B60N 2/08*    (2006.01)
(Continued)

(52) U.S. Cl.
CPC ....... *B60N 2/02246* (2023.08); *B60N 2/0244* (2013.01); *B60N 2/0881* (2013.01);
(Continued)

(58) Field of Classification Search
CPC .............. B60N 2/02246; B60N 2/0244; B60N 2/0881; B60N 2/10; B60N 2/14; B60N 2/02253; B60N 2/0268
See application file for complete search history.

(56) References Cited

U.S. PATENT DOCUMENTS 5,882,060 A * 3/1999 Walk .................. B60N 2/42727
                                                296/65.01
8,360,368 B2 * 1/2013 Bertrand ............ B64D 11/0639
                                                297/344.21
(Continued)

FOREIGN PATENT DOCUMENTS

DE    10141875 A1    3/2003
DE    10138893 C1    4/2003
(Continued)

OTHER PUBLICATIONS

Europen Patent Office, International Search Report and Written Opinion in Application No. PCT/EP2020/075198, dated Dec. 22, 2020, 11 pages, Rijswijk, Netherlands.

*Primary Examiner* — Mark R Wendell
(74) *Attorney, Agent, or Firm* — Marshall & Melhorn, LLC

(57) ABSTRACT

A floating seat may have at least one seat shell with a seat surface region and a backrest region. The seat may also have a base element on which the seat shell is arranged in an adjustable manner, and an adjustment mechanism for adjusting the seat shell relative to the base element and/or a seat base. The adjustment mechanism has at least one adjustment unit for adjusting the seat shell and at least one drive unit which is designed to lock the base element and the seat shell in place in a self-locking manner. The lock can be released by a force introduced into the adjustment unit by an occu- (Continued)

pant sitting in the seat shell via said seat shell as well as by a force introduced into the adjustment unit by the drive unit.

14 Claims, 13 Drawing Sheets

(51) Int. Cl.
  *B60N 2/10* (2006.01)
  *B60N 2/14* (2006.01)
(52) U.S. Cl.
  CPC ................ *B60N 2/10* (2013.01); *B60N 2/14* (2013.01); *B60N 2/02253* (2023.08); *B60N 2/0268* (2023.08)

(56) References Cited

U.S. PATENT DOCUMENTS

| | | | |
|---|---|---|---|
| 9,428,088 B1* | 8/2016 | Rajasingham | B60N 2/68 |
| 10,195,964 B2* | 2/2019 | Martin | B60N 2/1695 |
| 2006/0192052 A1* | 8/2006 | Baumann | B64D 11/06 |
| | | | 244/122 R |
| 2018/0178690 A1* | 6/2018 | Castillo | B60N 2/002 |
| 2019/0359087 A1* | 11/2019 | Galan Garcia | B60N 2/686 |

FOREIGN PATENT DOCUMENTS

| | | |
|---|---|---|
| DE | 102017221987 A1 | 6/2019 |
| EP | 0699555 A2 | 3/1996 |
| WO | 2018049228 A1 | 3/2018 |

\* cited by examiner

SEAT ASSEMBLY

FIELD

The invention concerns a seat assembly with a seat, in particular a floating seat, for a vehicle, in particular with a vehicle seat which is adjustable relative to a body floor, in particular length-adjustable, tiltable, rotatable and/or pivotable.

BACKGROUND

Adjustable seats, in particular vehicle seats such as floating seats, are known in the prior art for maximizing comfort. Generally, such a seat of a seat assembly comprises a locking mechanism for locking or unlocking the floating seat, and an adjustment mechanism.

SUMMARY

The object of the present invention is to indicate a seat assembly with a seat, in particular a floating seat, with improved comfort and better safety.

This object is achieved according to the invention with a seat assembly having the features of claim 1.

Refinements of the invention are the subject of the dependent claims.

The seat assembly according to the invention comprises at least one seat with a seat surface region and a backrest region, a base element on which the seat is adjustably arranged, at least one adjustment unit for adjusting the seat relative to the base element and/or a seat base, and at least one drive unit which is configured to lock the base element and the seat in a self-locking manner, and wherein the locking can be released both by a force introduced into the adjustment unit via the seat by an occupant sitting in the seat, and also by a force introduced into the adjustment unit by the drive unit.

The invention allows, in a simple fashion, a combination of an autonomous adjustment by a shift of the center of gravity of a person sitting in the seat, and a motorized adjustment based on a set or activated adjustment mode.

The seat comprises for example a seat surface and a backrest which are arranged fixedly relative to one another. The seat adjustment takes place via a body movement of the occupant sitting in the seat. In contrast to previously known seat adjustment devices, adjustments about one or more adjustment axes are made not via a manually controlled input facility but solely via a shift in the center of gravity or support of the occupant against the seat, in particular the seat surface of the seat.

In a possible embodiment, the seat is configured as a seat shell. Instead of the shell form, the seat may be formed from a seat part and a backrest. These may be separate seat components which are connected together. Alternatively, the seat may be formed integrally.

The invention furthermore allows the seat to be adjustable even without an occupant. For example, the seat may automatically be brought back to a "normal" starting position or a position for easier entry/exit. Such an adjustment can be performed not only when the seat is "empty", but also when an occupant is sitting in the seat. For example, a stored position, such as e.g. a seat position or slightly or greatly tilted position, may be resumed automatically.

In other words, the seat comprises a mechanical motorized adjustment which utilizes the principle of self-locking, so that a separate locking device can be omitted.

A further embodiment provides that at least one force sensor is arranged in the force flow between the seat and the base element. The force sensor is arranged and configured such that it measures the force acting on the adjustment unit. The force sensor is here coupled to the drive unit such that the self-locking of the drive unit is released or at least reduced when adjustment mode is activated and a force is applied to the adjustment unit following a movement of the occupant in the seat. For example, for this the occupant has activated the adjustment mode of the seat so that, because of a shift in the center of gravity or a corresponding support of the occupant in the seat shell, this is automatically moved accordingly.

A further aspect provides a control unit which is coupled to the drive unit, the force sensor and/or an activation unit. Here, the control unit is coupled to the force sensor, the drive unit and/or the activation unit in order to activate an adjustment mode for signaling and/or control purposes.

A further embodiment provides that an adjustment command by the occupant is determined via an input unit, for example a switch or a voice signal, and/or via the activation unit. By input of the adjustment request or an adjustment mode via the input unit, for example via a voice command or by actuation of a switch, in particular one of several adjustment modes can be activated. Alternatively or additionally, the seat may comprise as an activation unit several contact sensors, for example the sensors which are also used for detecting seat occupancy, in order to activate the adjustment mode. The adjustment command may, alternatively or additionally, also be determined with fewer sensors which detect the force component in the actuation direction of the drive unit close to the drive.

In a possible embodiment, a float mode is activated wherein the control unit is configured, in activated float mode, to move the seat such that this follows a body movement of an occupant sitting in the seat. The seat, in particular the seat shell, is not locked in an assumed seat position.

Alternatively, an adjustment mode may be activated, wherein the control unit is configured, in activated adjustment mode, to move the seat such that it follows the body movement of an occupant sitting in the seat into a desired seat position, and wherein the seat is locked in the desired seat position.

In a further alternative embodiment, a driving comfort mode may be activated, wherein the control unit is configured, in activated driving comfort mode, to adjust the seat depending on momentary travel movements of the vehicle.

In a further embodiment, the adjustment unit is designed to execute an adjustment movement of the seat relative to the base element. For example, the adjustment unit is designed to execute an arcuate, circular and/or linear adjustment. In a further embodiment, the adjustment unit is configured as a spindle drive and/or rail adjuster, in particular a circular ring adjuster and/or linear longitudinal and/or transverse adjuster. Alternatively, the adjustment unit may be configured as a cable-pull mechanism or a combination of several different types of adjustment units. For example, the cable-pull mechanism is configured as an arcuate cable-pull with a circumferential cable.

A further embodiment provides that the drive unit comprises at least one gear motor unit which is coupled to the adjustment unit, in particular to the cable-pull mechanism and/or the rail adjuster. The drive unit comprises and actuates e.g. a Bowden cable mechanism or a spindle, which actuates a cable of the cable-pull mechanism and/or a rail of the at least one adjustment unit which acts on a carrier coupled for movement purposes to the seat.

In a possible embodiment, the gear motor unit is configured as a self-locking worm gear with motor. The cable of the cable-pull mechanism or the rail is coupled for movement purposes to the self-locking worm gear of the gear motor unit. For example, the cable is held by means of two deflecting rollers which are driven by the gear motor unit via Bowden cables of the Bowden cable mechanism. In addition, the cable is coupled to a carrier which is attached to the seat.

If the carrier substantially follows an arc or arc segment of the seat shell or another form of the seat surface, and the cable rests on the seat side on the arc segment, the adjustment mechanism may be designed to be largely stiff since almost no length adjustment for the cable is necessary. The seat is in particular locked via the cable and self-locking of the worm gear, but if a motor is used, it is also adjustable via the motor.

Furthermore, the seat and the base element and/or the seat base and the force sensor arranged in between are actively coupled such that as a resulting force, the force introduced by an occupant sitting in the seat acts on the force sensor. In order in particular to measure largely only the force introduced into the seat by the occupant, the adjustment mechanism, in particular the adjustment unit with its components such as e.g. a cable-pull mechanism, the deflecting rollers and carrier, and the drive unit are supported via the force sensor against the base element and/or seat base, e.g. a vehicle floor.

By arranging the force sensor between the seat base and the seat with the seat components, such as the adjustment unit, drive unit and carrier, mounted on a structural support, it is ensured that a preload of the adjustment unit necessary to ensure absence of play, such as e.g. the necessary pretension of a cable of a cable-pull mechanism, is not superposed on the force measurement signal, but only resulting forces from the adjustment command act on the force sensor.

For this, the base element with at least the adjustment unit and/or the drive unit, and/or said base element itself, is mounted on the seat base, for example the vehicle floor, by means of support points. In order to secure this singular point of force transmission, the adjustment unit and/or drive unit is mounted against the seat base at the support points such that the force component in the measurement direction is influenced as little as possible.

For a compact construction of the seat assembly, both the drive unit and also the adjustment unit and/or the control unit may be assigned to the base element. In addition, a separate guidance of the adjustment unit, e.g. of the cable, may be provided. The guidance of the cable over the deflecting roller and its movement via the Bowden cables furthermore allow the drive unit to be assigned to the base element, so that the seat shell carries less weight. This also simplifies the electrical supply to the motor.

For rotating the seat about its vertical axis, a separate adjustment device may be provided. This separate adjustment device comprises for example a further drive unit formed from a motor and a worm gear, which is arranged directly without cable-pull mechanism at the pivot point of the seat or along an arc segment of a seat shell of the seat with the pivot point as the center point, or is coupled to the seat or seat shell, wherein a further force sensor, as a transmission element for tangentially acting forces, is arranged between the seat or seat shell and the base element and measures the tangentially acting forces.

In addition, force threshold values may be parameterized. Thanks to the possibility of parameterizing the force threshold values, the temporal behavior of the adjustment mechanism and the translation factor of the force application and adjustment speed, the adjustment behavior of the seat may be adapted and modified. In particular, further sensors for location determination may allow the setting of location-dependent adjustment parameters.

In addition, a number of end stops may be provided to limit the adjustment movement of the seat. Moreover, a trap-protection device based on seat environment sensors may be provided. Furthermore, environmental influences, such as for example vehicle acceleration or deceleration, may be taken into account, in particular compensated. For this, by means of the control unit, vehicle parameters such as vehicle acceleration or deceleration may be determined and an adapted control signal for the drive unit may be generated accordingly.

The seat shell may furthermore be provided with an overload protection for absorbing overload forces. The overload protection prevents high forces, e.g. because of an accident, having to be dissipated via the adjustment unit and the self-locking drive unit. Such an overload protection is for example formed by two T-shaped levers, the foot points of which are mounted on the seat and connected together. For example a cable, in particular a steel cable or a spindle, is attached above the crossbars of the T-shaped levers. A sawtooth structure opposing the other lever is arranged below each lever.

In a further embodiment, the seat is designed as a seat shell with a seat surface region and a backrest region, wherein the seat shell is adjustable relative to the base element in at least two rotational degrees of freedom by means of an adjustment mechanism, in particular is rotatable, tiltable and/or pivotable, wherein the adjustment mechanism comprises at least one adjustment unit for adjusting the seat shell in at least one of the rotational degrees of freedom, and has at least one associated drive unit which is controllable for adjusting the seat shell in the at least one rotational degree of freedom by means of a control unit, and wherein at least one force sensor is arranged in the force flow between the at least one drive unit and the respective adjustment unit and is coupled to the control unit for signaling and/or control purposes.

The advantages achieved with the invention include in particular that such a seat of a seat assembly can be adjusted under control according to a body movement of a person sitting in the seat.

Thus the seat, in particular the seat shell, may automatically assume a desired position. By means of such a direct force-controlled adjustment mechanism, the seat is adjustable or movable in the manner of a free-floating seat (also called a floating seat), in particular can be tilted forward or backward or to the side, and rotated about a vertical axis.

For this, the force sensor lies directly in the force flow between the seat, in particular the adjustment unit, e.g. a pivot mechanism or rotation mechanism or tilt mechanism, and the base element, in particular the associated drive unit, e.g. a drive unit for the pivot mechanism, a drive unit for the rotation mechanism and a drive unit for the tilt mechanism, and/or the seat base, in particular a vehicle floor.

Here, the seat moves in the direction of the greatest force measured by means of the force sensor in the respective force flow. In particular, the seat is adjusted under control such that the greater the measured force in the respective force flow, the faster the associated drive unit, e.g. an adjustment motor, adjusts the seat.

The control unit is furthermore configured such that to adjust the seat, optionally or additionally, various adjustment modes can be activated.

For example, the control unit comprises a float mode which is configured, on activation, such that the seat, in particular the seat shell, follows the body movement of the person sitting in the seat, in particular in the seat shell. For this, the control unit controls the drive unit(s) depending on the momentary force signal of the force sensor(s), and hence according to the body movements—tilt forward or backward or to the side, and/or rotation of the seat about the vertical axis—and thus continuously adapts the attitude and/or position of the seat relative to the base element and/or the seat base in synchrony with the body.

In addition, the control unit may comprise an adjustment mode which is configured, on activation, such that the seat, e.g. the seat shell, follows the body movement of the person sitting in the seat, e.g. the seat shell, into a desired seat position, wherein the seat, in particular the seat shell, is locked in this desired seat position.

Furthermore, the control unit may comprise a driving comfort mode (also known as active float mode) which is configured, on activation, such that an adjustment of the seat, e.g. the seat shell, takes place depending on the momentary travel movements of the vehicle, such as braking, cornering or acceleration. For example, when the vehicle travels through a corner, the seat, e.g. the seat shell, tilts accordingly to the side, in particular accordingly into the corner. In addition, depending on a possible identified collision, the seat may be set or held in a seat position which is safe for the person sitting in the seat, e.g. in the seat shell. Also, in the case of correspondingly strong forces such as those occurring during a collision, the seat may be actively floatingly adjusted so as to counter the acting force. For this, the control unit is additionally coupled for signaling purposes to further sensors, in particular acceleration, braking, speed and/or collision sensors, and/or other control units in the vehicle.

One aspect provides that the seat can be tilted relative to the base element by means of the adjustment mechanism at least about a transverse axis, in particular forward, e.g. by −8°, or backward e.g. by +15°, and rotated about a vertical axis, in particular relative to a longitudinal axis of the vehicle, by 45° towards the outside or 15° towards the inside.

In a possible embodiment, the seat can be tilted relative to the base element in the longitudinal direction about a transverse axis in a range between −8° (forward) to +15° (backward) relative to a neutral position, which for example corresponds to a seat or design position of +25°, and/or tilted or rolled in the transverse direction about a longitudinal axis in a range between 0° and 5°, and/or rotated or pivoted about a vertical axis of the floating seat by up to maximum 45°, in particular rotated relative to a longitudinal axis of the vehicle by 45° towards the outside or 15° towards the inside.

For example, in the design or seat position, the seat assumes an attitude in which the seat is oriented towards the front in the longitudinal direction and hence in the direction of travel/vision. This position is called the 0° position relative to the vertical axis (Z axis) and longitudinal axis (X axis). In this design or seat position, for improved seat comfort, the seat can be tilted backward about the transverse axis (Y axis), for example by +25°. The seat can be tilted by means of the adjustment mechanism relative to the design or seat position, e.g. about the transverse axis, by up to −8° forward for an improved entry or exit and up to 15° backward for a reclining seat position. As a maximum, the seat can be tilted about the transverse axis by up to 120°. About the vertical axis, the seat shell can be rotated in particular by maximum 280°, in particular by −90° up to +190°, in particular by 45° towards the outside or 15° towards the inside relative to the design or seat position.

DESCRIPTION OF THE FIGURES

Exemplary embodiments of the invention are explained below with reference to drawings. The drawings show.

DETAILED DESCRIPTION

Mutually corresponding parts carry the same reference signs in all figures.

Figure 1:
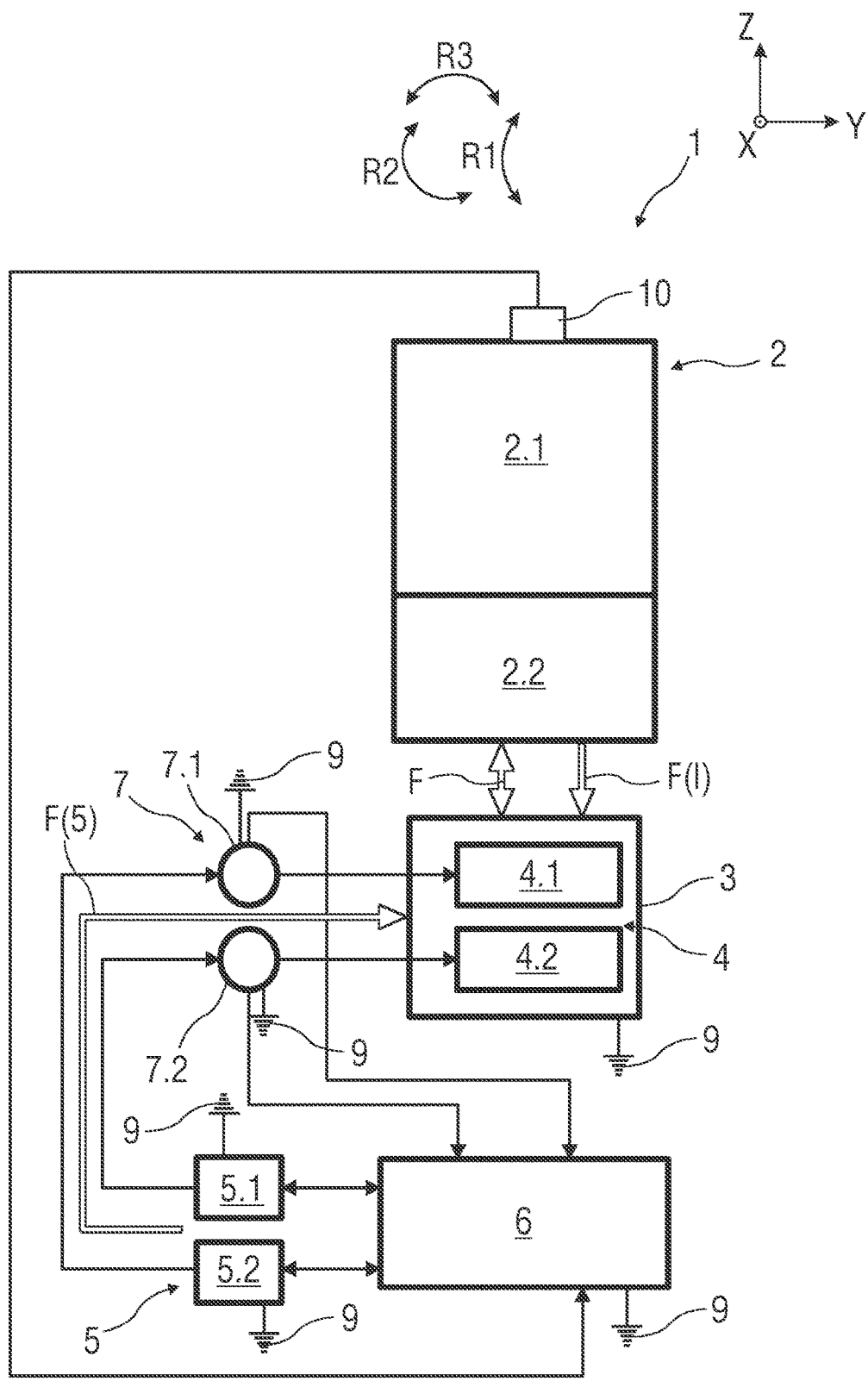
FIG. 1 schematically, a seat assembly with an adjustable seat, an adjustment mechanism and a control unit, which is coupled to a drive unit for adjustment of the seat, FIG. 2 schematically, in perspective view, a seat assembly with an adjustable seat, in particular a floating seat, FIG. 3 schematically, in plan view from above onto a seat surface of an adjustable seat, an adjustment mechanism for the seat, FIG. 4 schematically, in plan view from below, the adjustment mechanism of the seat from FIG. 3, FIG. 5 schematically, in sectional illustration, the adjustment mechanism from FIG. 3 or 4, FIG. 6 schematically, the adjustment mechanism in the region of the force sensor, FIG. 7 schematically, the adjustment mechanism in the region of the force sensor, FIG. 8 schematically, the adjustment mechanism in the region of the force sensor, FIG. 9 schematically, in perspective illustration, a seat with freely adjustable seat shell, FIG. 10 schematically, in perspective view, the adjustment mechanism, FIG. 11 schematically, in perspective view, the adjustment mechanism, FIG. 12 schematically, in perspective view, the adjustment mechanism, FIG. 13 a schematic view of a further embodiment of a seat with a freely adjustable seat shell with self-locking drive unit, FIG. 14 a schematic view of an overload protection in unloaded state, FIG. 15 a schematic view of an overload protection in loaded state, FIG. 16 a perspective view of a further embodiment of an adjustment mechanism with coupled drive unit, and FIG. 17 schematically, an embodiment of a coupling of control unit, force sensor and drive unit.

FIG. 1 shows schematically a seat assembly 1, in particular a vehicle seat. The seat assembly 1 is in particular provided in a vehicle and there attached to a vehicle floor in a manner not shown in detail. The seat 2 is configured as a movable, in particular free-floating adjustable seat 2 (also called a floating seat). The seat 2 may be configured as a seat shell as illustrated and described in more detail below. Alternatively, the seat 2 may be formed from multiple pieces in the conventional fashion with a seat part and a backrest (not shown in detail). The following adjustment of the seat 2 using the example of the seat shell applies accordingly to the adjustment of a multipiece seat.

The seat 2 of the seat assembly 1 can be moved in various modes as will be described below. For this, the seat assembly 1 comprises a base element 3 on which the seat 2 is arranged so as to be adjustable relative to the base element 3 and/or a seat base 9. To adjust the seat 2, the seat assembly 1 comprises at least one adjustment unit 4 and a drive unit 5.

The seat 2 is configured as a seat shell with a backrest region 2.1 and a seat surface region 2.2.

For better clarity in the description of the seat adjustment using the example of adjustment of a seat shell, the seat shell is referred to below as the "seat shell 2":

The seat shell 2 can be adjusted relative to a base element 3 in at least two of several rotational degrees of freedom R1 to R3 by means of an adjustment unit 4; in particular, it is rotatable, tiltable and/or pivotable. A first rotational degree of freedom R1 allows an adjustment of the seat shell 2 about a transverse axis Y, a second rotational degree of freedom R2 allows an adjustment of the seat shell 2 about a longitudinal axis X, and a third rotational degree of freedom R3 allows an adjustment about a vertical axis Z.

The adjustment unit 4 may comprise at least one separate adjustment unit 4.1, 4.2 (shown in FIGS. 1 and 2 to 6, 10 to 11) per rotational degree of freedom R1, R2 for adjustment of the seat shell 2.

The respective adjustment unit 4, 4.1, 4.2 is coupled to at least one associated drive unit 5, 5.1, 5.2 for movement, in particular free-floating movement or adjustment, of the seat shell 2. For controlled movement, in particular adjustment, of the seat shell 2 in the at least one rotational degree of freedom R1, R2, the respective drive unit(s) 5, 5.1, 5.2 can be controlled by means of a control unit 6.

In addition, at least one force sensor 7, 7.1, 7.2 is arranged in the force flow F between the at least one drive unit 5, 5.1, 5.2 and the respective adjustment unit 4, 4.1, 4.2, and is coupled to the control unit 6 for signaling and/or control purposes.

In addition, the seat assembly 1 comprises an activation unit 10 for activating an adjustment mode for unlocking and adjusting the seat shell 2. The activation unit 10 is also coupled to the control unit 6 for signaling and/or control purposes.

A seat assembly 1 with a seat shell 2 configured in this fashion, with drive units 5, 5.1 and 5.2 controlled by means of force sensors 7, 7.1, 7.2 and adjustment units 4, 4.1, 4.2, allows an individual, in particular comfortable and e.g. free-floating movement of the seat shell 2. In particular, a seat assembly 1 with such a seat 2 may be adjusted under control according to a body movement of a person sitting in the seat shell 2. Thus the seat 2, in particular the seat shell 2, may automatically with free movement assume a desired position. By means of such a direct, force-controlled adjustment mechanism with one or more adjustment units 4, 4.1, 4.2, the seat shell 2 can be adjusted or moved in the manner of a free-floating seat shell 2, in particular can be tilted forward or backward about a transverse axis Y and to the side about a longitudinal axis X, and rotated about a vertical axis Z.

Here, the respective drive unit 5, 5.1 and/or 5.2 is configured to lock the base element 3 and seat shell 2 in self-locking fashion, wherein the locking can be released both by a force F(I) introduced into the adjustment unit 4, 4.1 and/or 4.2 via the seat shell 2 by a occupant sitting in the seat shell 2, and also by a force F(5) introduced into the adjustment unit 4, 4.1 and/or 4.2 by one of the drive units 5, 5.1 and/or 5.2.

Figure 2:
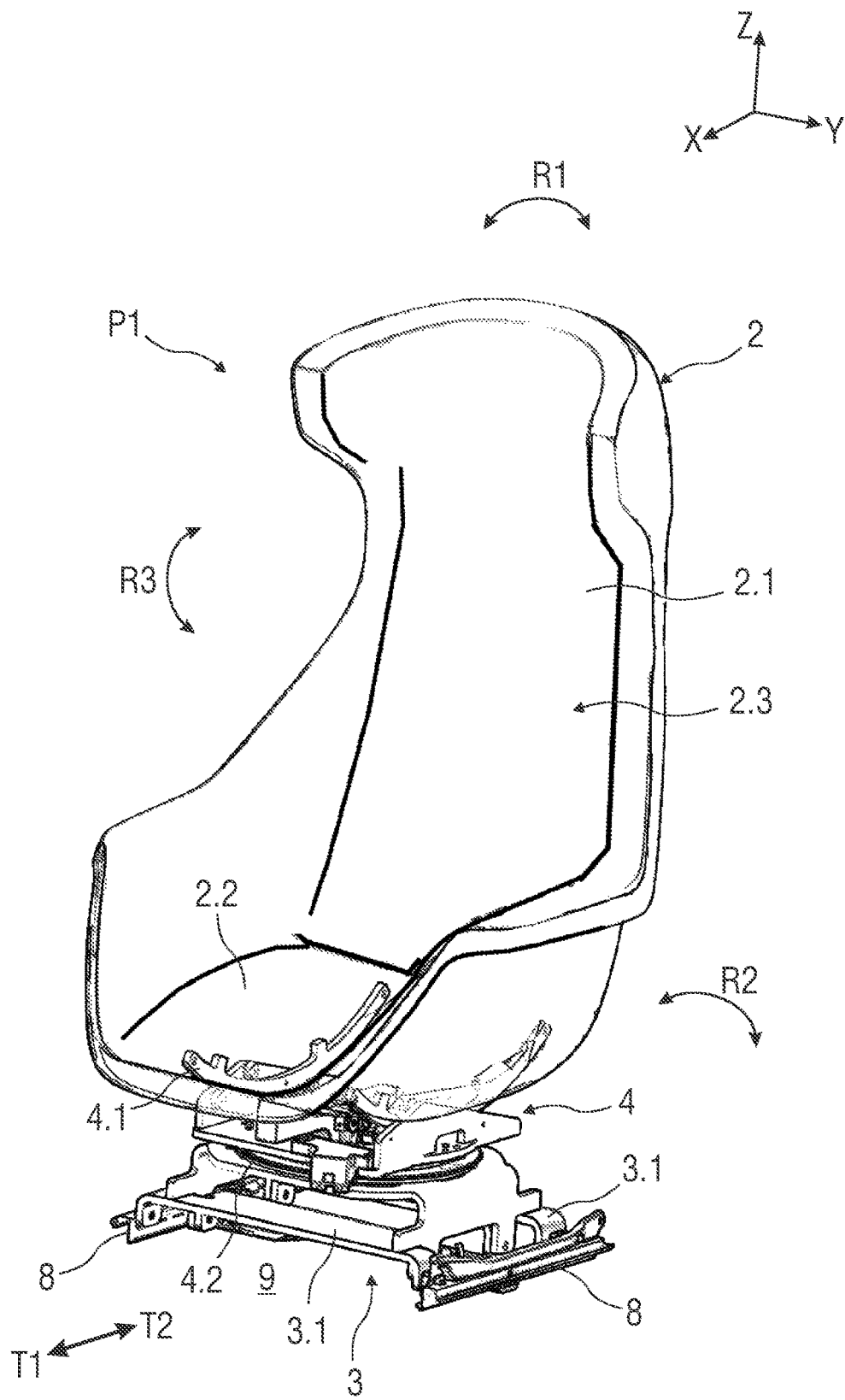

FIG. 2 shows schematically, in perspective view, the movable, in particular adjustable seat 2. The seat 2 is configured as a floating seat or a free-floating or freely movable seat shell 2.

Here, the seat shell 2 may be formed as one piece or in multiple pieces from the backrest region 2.1 and the seat surface region 2.2. Alternatively, the seat shell 2 may be formed from a separate backrest region 2.1 and a seat surface region 2.2 arranged adjustably thereon, in particular tiltably (not shown in detail). The seat shell 2 comprises a carrier 2.3, in particular a hard foam shell or composite shell, in particular made of a fiber-reinforced plastic. In addition, the seat shell 2 may be provided with a padding element arranged thereon (not shown in detail), in particular a foam padding with or without covering.

The one-piece seat shell 2 is movable relative to the base element 3. As an adjustment mechanism, a number of adjustment units 4 to 4.2 are arranged between the seat shell 2 and the base element 3.

In particular, the adjustment mechanism is configured to execute a combined adjustment movement of the seat shell 2 relative to the base element 3. For example, the adjustment unit 4, 4.1, 4.2, is configured to execute an arcuate, circular and/or linear adjustment. In a further embodiment, the adjustment unit 4, 4.1, 4.2 is configured as a spindle drive and/or rail adjuster, in particular a circular ring adjuster and/or linear longitudinal and/or transverse adjuster. The respective adjustment unit 4, 4.1, 4.2 may for this comprise a hinge mounting, plain bearing, rail mounting or roller bearing. Thus the seat shell 2 is mounted on the base element 3 so as to be movable, in particular slidingly movable, in particular tiltable, rotatable and/or pivotable. By means of the adjustment units 4, 4.1, 4.2, the seat shell 2 is movable, in particular tiltable, rotatable or pivotable, relative to the base element 3 in at least two or all three rotational degrees of freedom R1, R2 and/or R3.

For example, in a design or seat position P1, the seat shell 2 assumes an attitude in which the seat shell 2 is oriented towards the front in the longitudinal direction x and hence in the direction of travel/vision. This seat position P1 is known as the 0° position relative to the vertical axis Z and longitudinal axis X. In this seat position P1, the seat shell 2 is tilted backward by 25° about the transverse axis Y for improved seating comfort. Here, the adjustment mechanism with the adjustment units 4, 4.1, 4.2 is configured such that, relative to the design or seat position P1, the seat shell 2 can e.g. be tilted about the transverse axis Y (rotational degree of freedom R1) by up to −10° or −8° forward and up to +15° backward relative to the 25°, and/or rotated about the vertical axis Z (rotational degree of freedom R2) in particular by maximum 280°, in particular by +45° towards the outside and −15° towards the inside.

In particular, for each rotational degree of freedom R1, R2, the adjustment mechanism comprises an associated adjustment unit 4.1 and 4.2. The adjustment unit 4.1, for tilt movement of the seat shell 2 forward or backward about the transverse axis Y and to the sides about the longitudinal axis X, is configured e.g. as a pivot joint, a sliding mechanism or cable-pull mechanism 41.1, or as a rail adjustment mechanism with roller bearings. For the rotational movement of the seat shell 2 about the vertical axis Z, the adjustment unit 4.2 is configured for example as a ring rail mechanism with roller bearings.

The adjustment units 4.1, 4.2 are coupled to one another for movement purposes. In addition, the adjustment units 4.1, 4.2 are arranged between the base element 3 and the seat shell 2, in particular below the seat shell 2, in particular on an underside of the seat surface region 2.2.

In addition, the base element 3 may be arranged on a length adjustment unit 8, in particular a rail pair, for length adjustment of the seat assembly 1 relative to the seat base 9, for example a vehicle floor. The base element 3 is for example a seat carrier and comprises several crossbar elements 3.1. Alternatively, the base element 3 may also be configured as a carrier plate 3.2 (shown for example in FIGS. 5, 9, 16).

For a compact arrangement, the drive units 5.1, 5.2 and the control unit 6 may be assigned to the base element 3, and be mounted thereon and attached thereto. The base element 3 is in turn mounted on the seat base 9.

The seat assembly 1 is thus configured such that a position of the seat shell 2 relative to the base element 3 and/or seat base 9 can be set for example by means of the length adjustment unit 8 in translational degrees of freedom T1, T2 in the longitudinal direction x, and/or by means of the adjustment units 4.1, 4.2 in the rotational degrees of freedom R1 to R3. For this, the adjustment mechanism is provided with the adjustment units 4.1, 4.2. The free movement, in particular the setting or adjustment of the position of the seat shell 2 in more than two degrees of freedom, creates the impression of a floating or sliding seat shell 2 which follows a movement of a person in the seat shell 2 as a result of a shift in the center of gravity of the person sitting in the seat shell 2.

Figure 3:
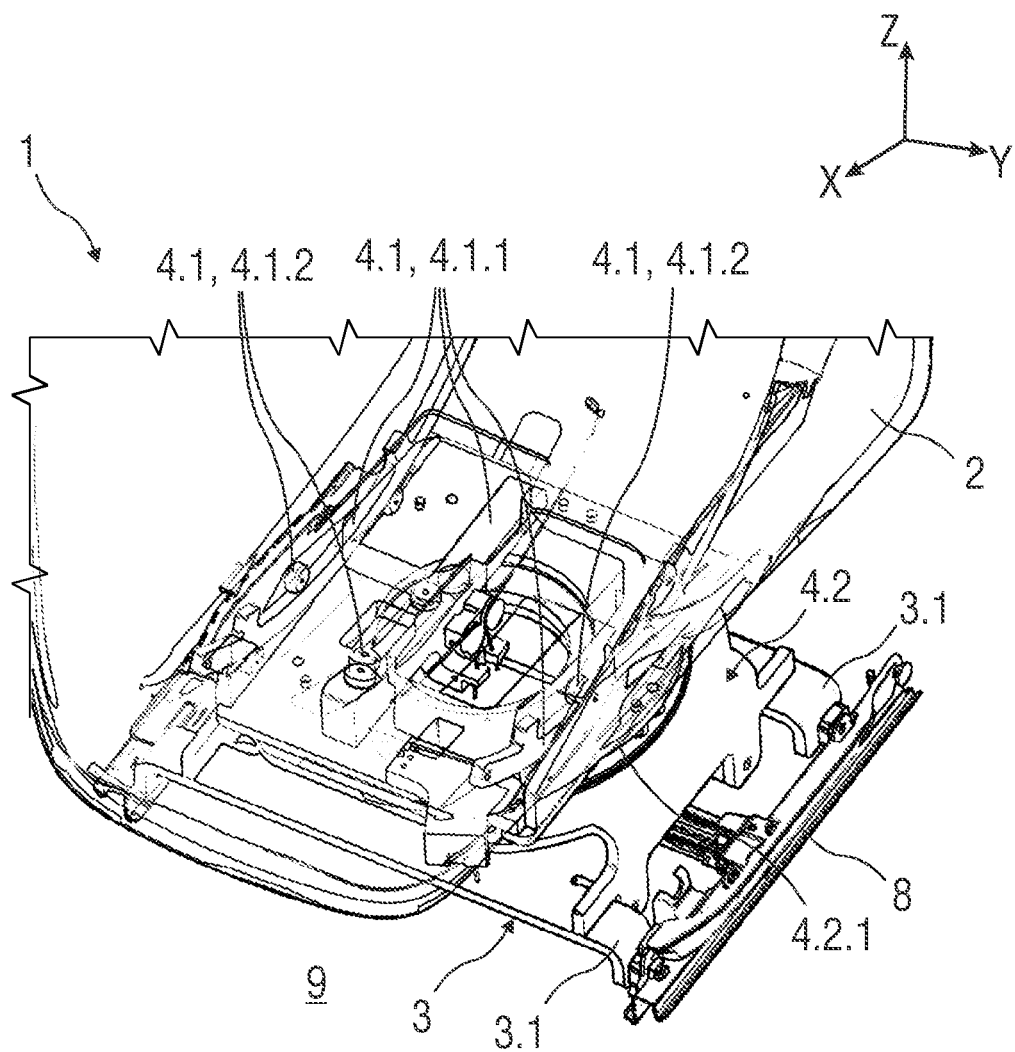

FIG. 3 shows schematically, in a partially transparent plan view from above onto the seat surface region 2.2 of the movable seat assembly 1, the adjustment mechanism with the adjustment unit 4.1 (also called the Y adjustment unit 4.1) for the tilt movement of the seat shell 2 forward or backward about the transverse axis Y, and the adjustment unit 4.2 (also called the Z adjustment unit 4.2) for the rotational movement of the seat shell 2 about the vertical axis Z.

The Y adjustment unit 4.1 is configured for example as a sliding mechanism, in particular a rail-roller mechanism. The Y adjustment unit 4.1 comprises at least three rails 4.1.1 and associated roller bearings with rollers 4.1.2, by means of which the seat shell 2 is mounted slidingly relative to the base element 3. The Z adjustment unit 4.2 is for example configured as a ring rail adjustment mechanism with a ring rail 4.2.1.

Figure 4:
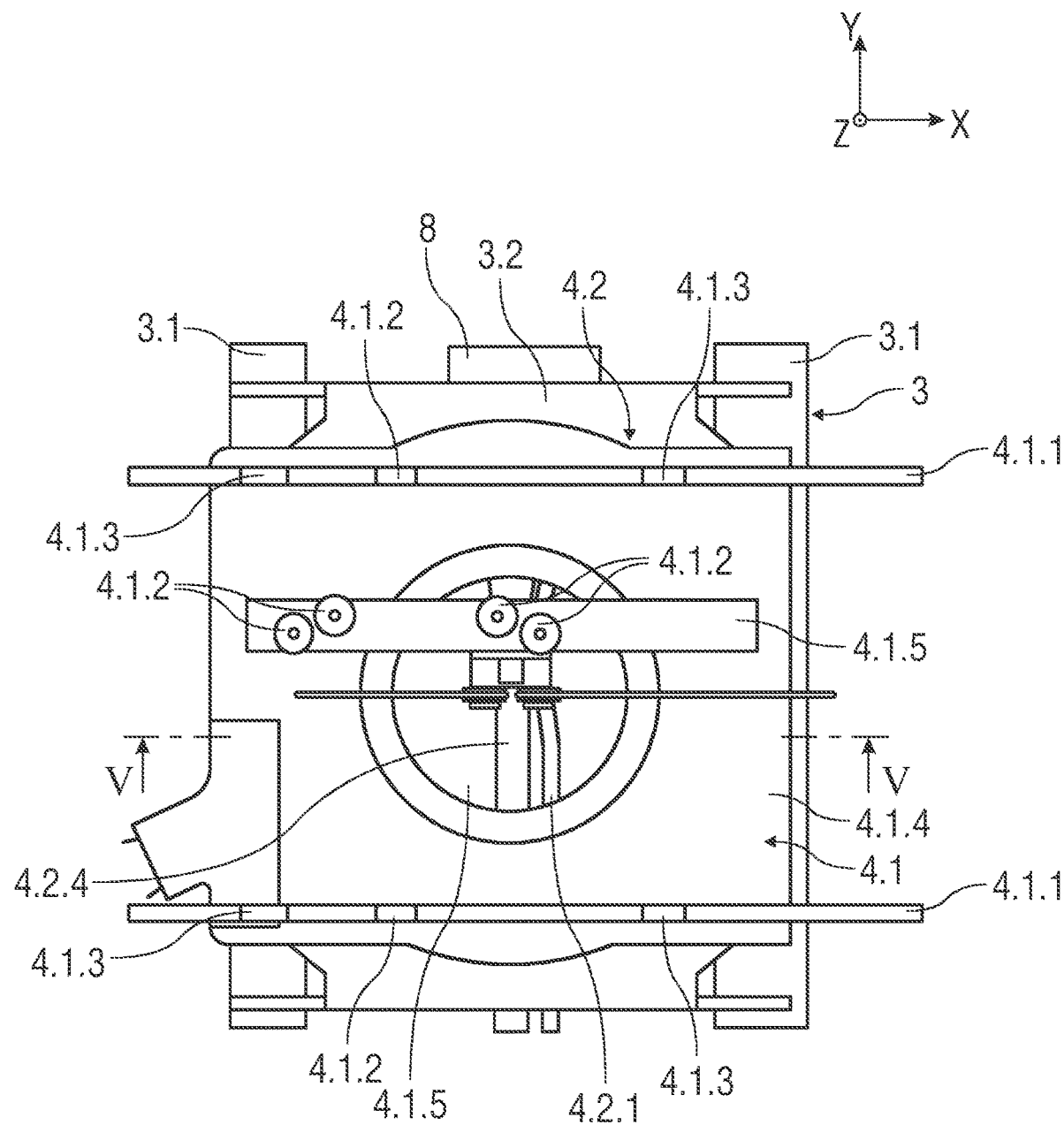

FIG. 4 shows schematically, in plan view from below, the adjustment mechanism 4 of the seat assembly 1 from FIG. 3.

For the tilt movement of the seat shell 2 forward or backward about the transverse axis Y, the adjustment unit 4.1 comprises at least two curved rails 4.1.1 spaced apart from one another with rollers 4.1.2 for a sliding or rolling movement of the seat shell 2 on the rails 4.1.1. The respective rail 4.1.1 in addition comprises end stops 4.1.3 protruding in the longitudinal direction x in the direction of the seat shell 2, for limiting the tilt movement of the seat shell 2 forward and backward about the transverse axis Y. The adjustment unit 4.1 comprises a carrier element 4.1.4, in particular a carrier plate 3.2, for fixing the rails 4.1.1.

In addition, the adjustment unit 4.1 may comprise a guide rail 4.1.5 with rollers 4.1.2. The guide rail 4.1.5 and rollers 4.1.2 ensure that no play exists in the Y direction (transverse movement) or Z direction (rotation or turning about the vertical axis Z). The guide rail 4.1.5 may be formed straight or curved. Alternatively, the guide rail 4.1.5 may also be functionally implemented in the length adjustment unit 8 (not shown in detail).

For the rotational movement of the seat shell 2 about the vertical axis Z, the adjustment unit 4.2 comprises a ring rail 4.2.1 which is arranged and secured in a passage opening 4.1.6 of the carrier element 4.1.4.

The ring rail 4.2.1 is configured as a horizontal ring rail pair and comprises an upper ring rail 4.2.2 and a lower ring rail 4.2.3. The upper ring rail 4.2.2 is fixedly held in the carrier element 4.1.4. The lower ring rail 4.2.3 is fixedly held on the base element 3. The base element 3 comprises, in addition to the transverse carrier elements 3.1, also a carrier plate 3.2 for fixing of the lower ring rail 4.2.3.

Figure 5:
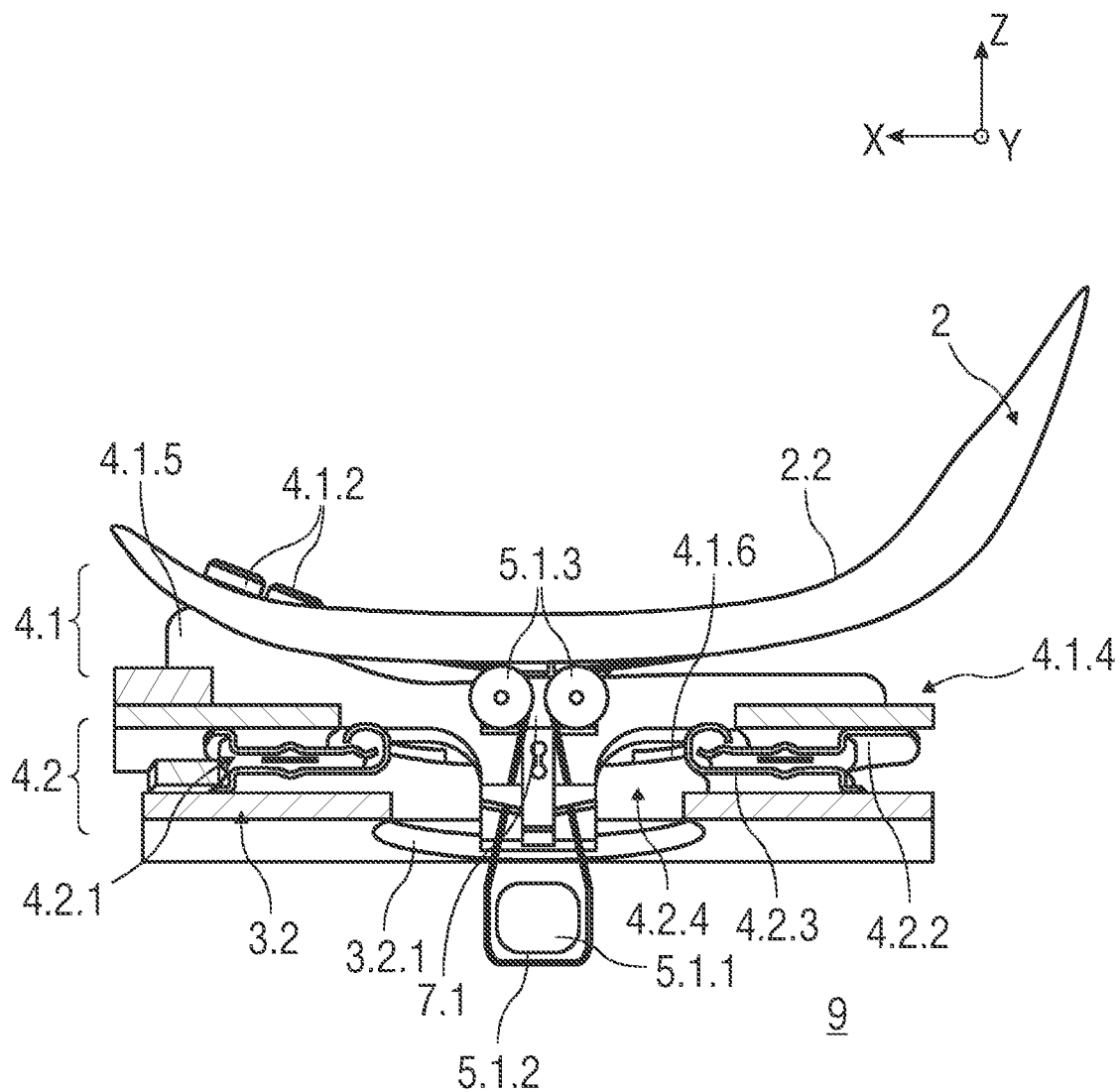

FIG. 5 shows schematically, in sectional view, the adjustment mechanism with the adjustment units 4.1 and 4.2 from FIG. 3 or FIG. 4.

The carrier plate 3.2 and the carrier element 4.1.4 each have centered passage openings 3.2.1 or 4.1.6 which lie one above the other. The ring rails 4.2.2, 4.2.3 are arranged relative to the carrier plate 3.2 and the carrier element 4.1.4 such that the inner ring opening 4.2.4 and the passage openings 3.2.1, 4.1.6 of the lower carrier plate 3.2 and upper carrier element 4.1.4 respectively lie one above the other.

The force-controlled movement of the seat shell 2 is described below using the example of the adjustment unit 4.1 for the tilt movement of the seat shell 2 about the transverse axis Y.

For this, the force sensor 7.1 lies in the force flow F between the seat shell 2 and the seat base 9. The force sensor 7.1 for the adjustment unit 4.1 in particular lies directly in the force flow F between the adjustment unit 4.1 and the associated drive unit 5.1.

The force sensor 7.1 is configured for example as a tension and/or pressure sensor for detecting pressure and/or tension loads. For example, the force sensor 7.1 is a strain gauge or another suitable component which detects a deformation, in particular elongation or compression. The force sensor 7.1 is connected to the control unit 6 for signaling and control purposes.

In the exemplary embodiment, the drive unit 5.1 is configured as a Bowden cable mechanism 5.1.5. The drive unit 5.1 comprises for example a motor 5.1.1 and a Bowden cable 5.1.2, and force transmission elements 5.1.3 for transmission of the adjustment force of the motor 5.1.1 into an adjustment movement of the seat shell 2 along the adjustment unit 4.1, in particular the rails 4.1.1 and the guide rail 4.1.5. The Bowden cable 5.1.2 is for this attached at the end to both the seat shell 2 and also to the output side of the motor 5.1.1.

Instead of a Bowden cable mechanism 5.1.5, another suitable mechanism may also be used. Preferably, a gear motor unit (not shown in detail) with gear wheels is used.

Figure 6:
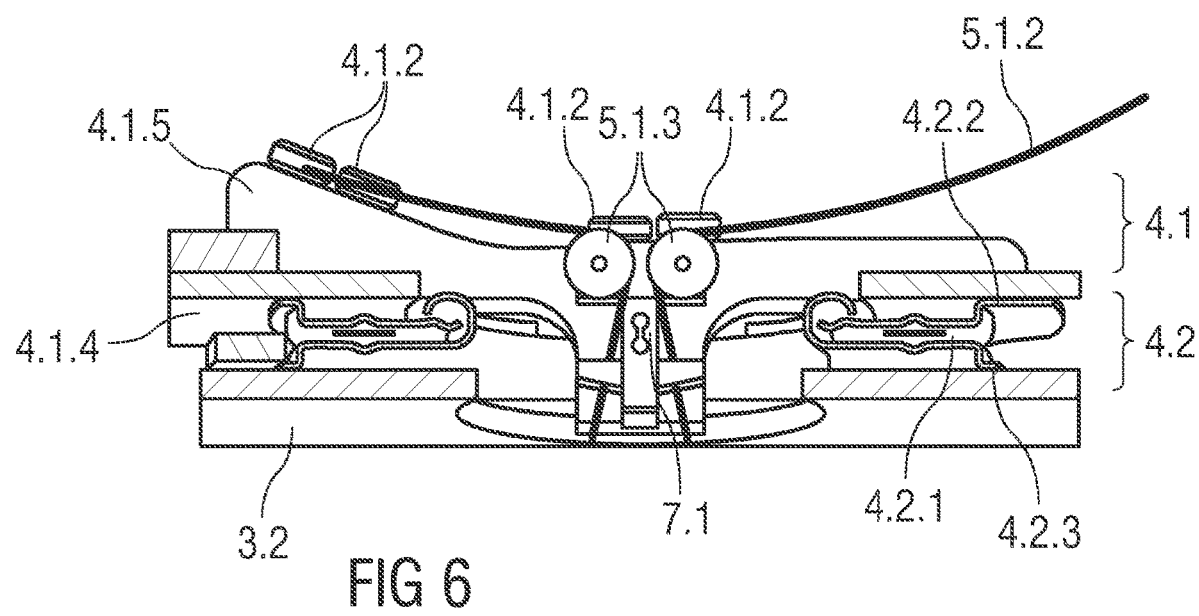
Figure 7:
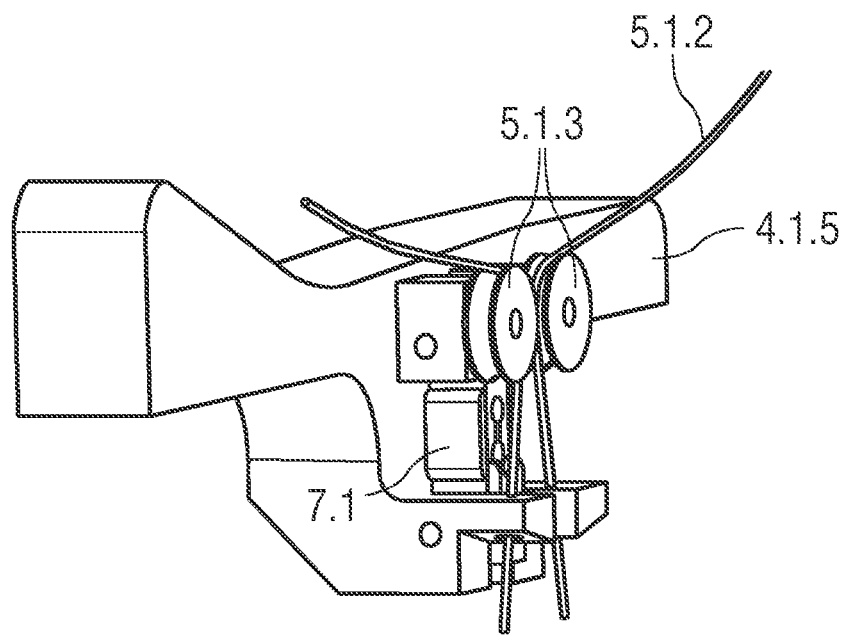
Figure 8:
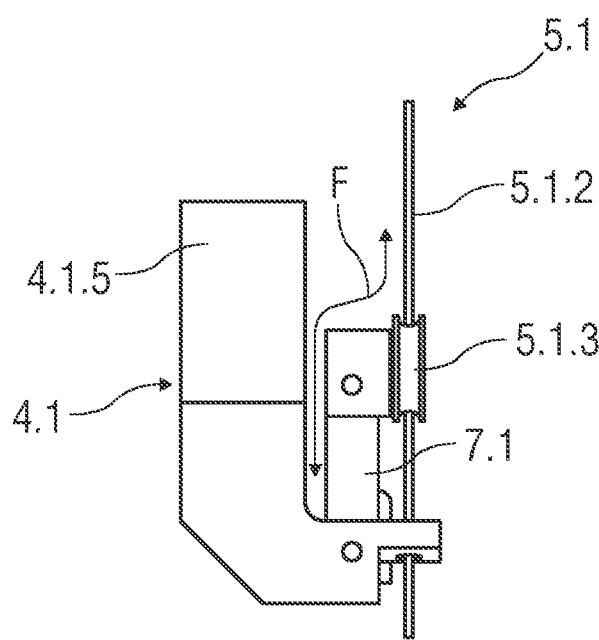

FIGS. 6 to 8 show schematically, in various illustrations, the adjustment mechanism with the adjustment units 4.1, 4.2 in the region of the force sensor 7.1. The force transmission elements 5.1.3 are configured for example as deflecting rollers 41.3 for the Bowden cable 5.1.2.

FIG. 8 shows the arrangement of the force sensor 7.1 directly in the force flow F between the adjustment unit 4.1 and the drive unit 5.1.

Figure 9:
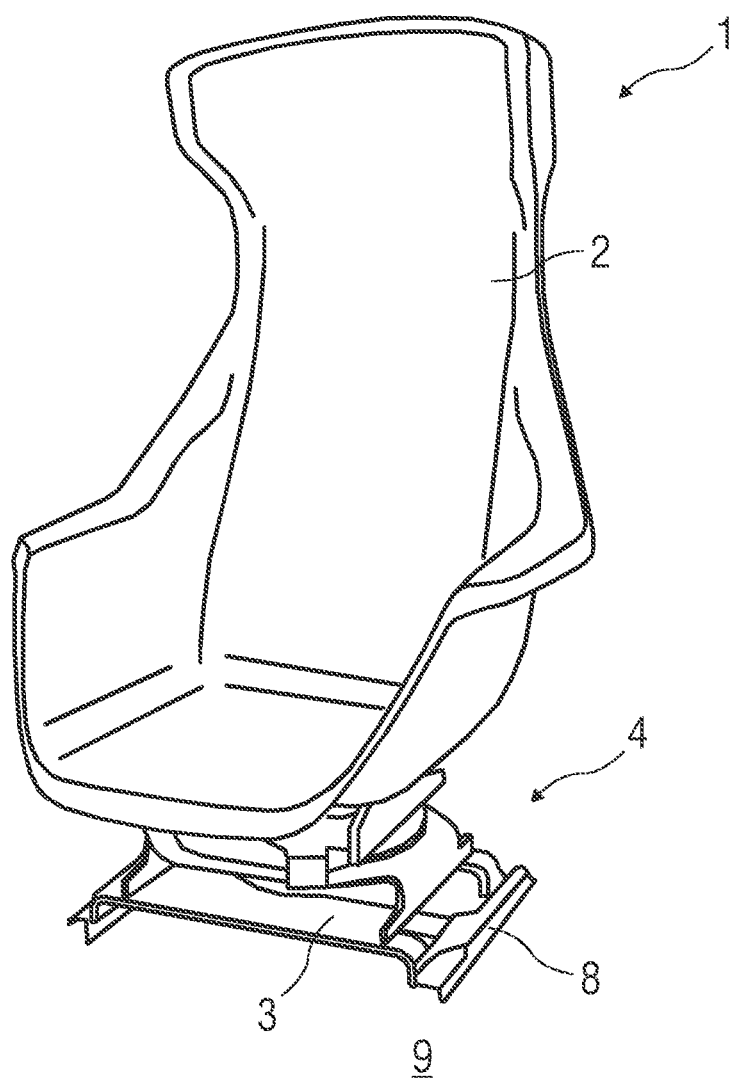

FIG. 9 shows schematically, in perspective view, the seat assembly 1 with freely adjustable seat shell 2.

Figure 10:
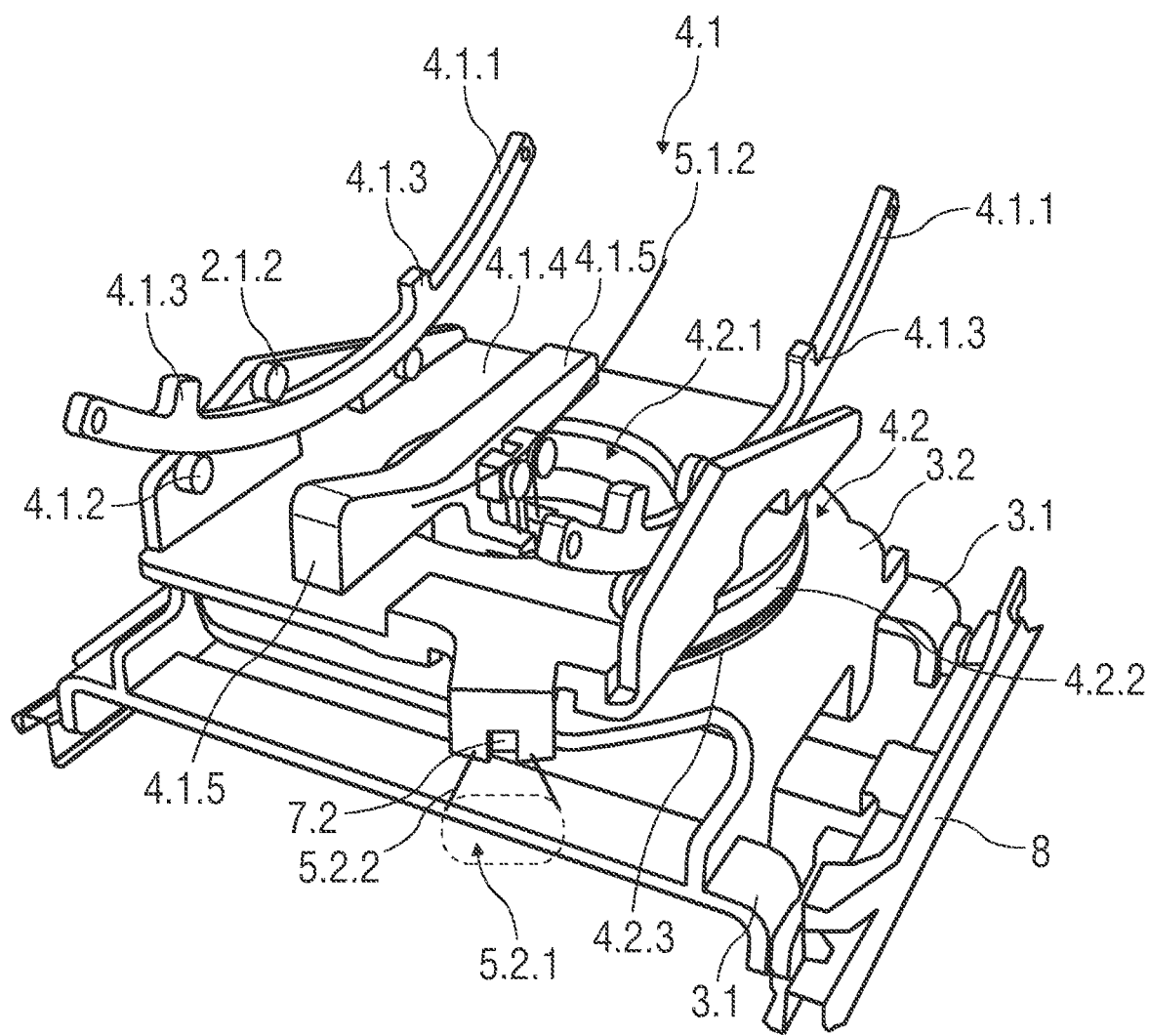
Figure 11:
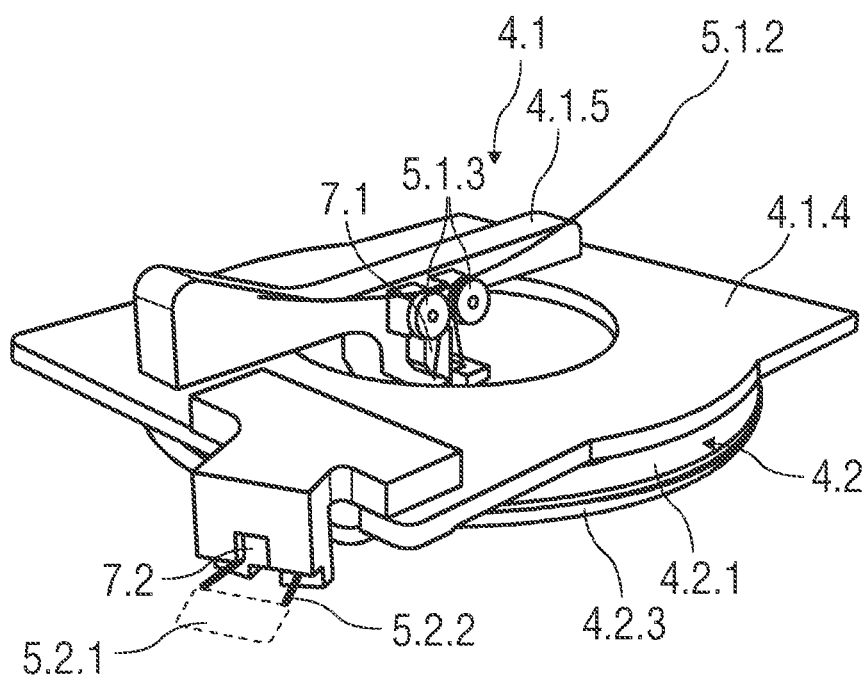
Figure 12:
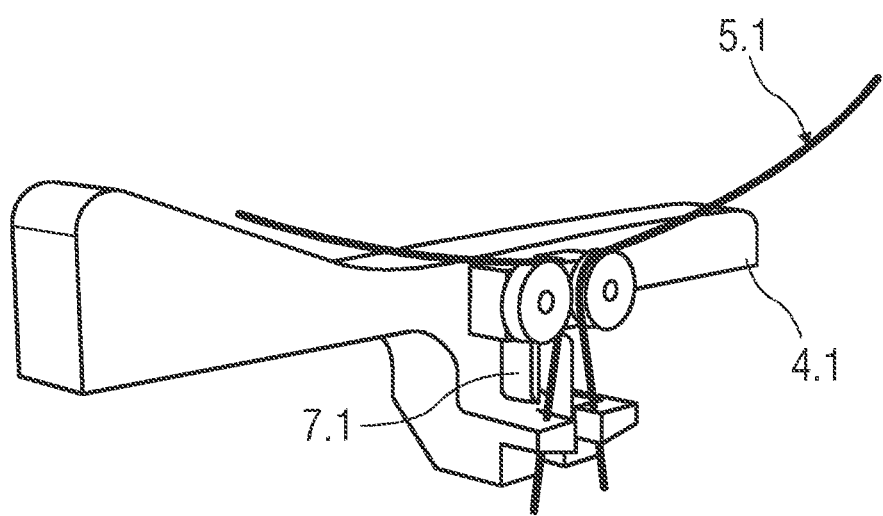

FIGS. 10 to 12 show schematically, in perspective view, the adjustment mechanism with the adjustment units 4.1 and 4.2 without seat shell 2.

FIGS. 11 and 12 show the drive unit 5.2 for the adjustment unit 4.2 for rotating the seat shell 2 about the vertical axis Z. In the exemplary embodiment, the drive unit 5.2 is shown for example as a Bowden cable mechanism 5.1.5. This is preferably configured as a gear motor unit with gear wheels. The associated force sensor 7.2 is arranged in the force flow F between the seat shell 2 and the seat base 9, in particular between the drive unit 5.2 and the adjustment unit 4.2, in a similar fashion to that for the adjustment unit 4.1.

Figure 13:
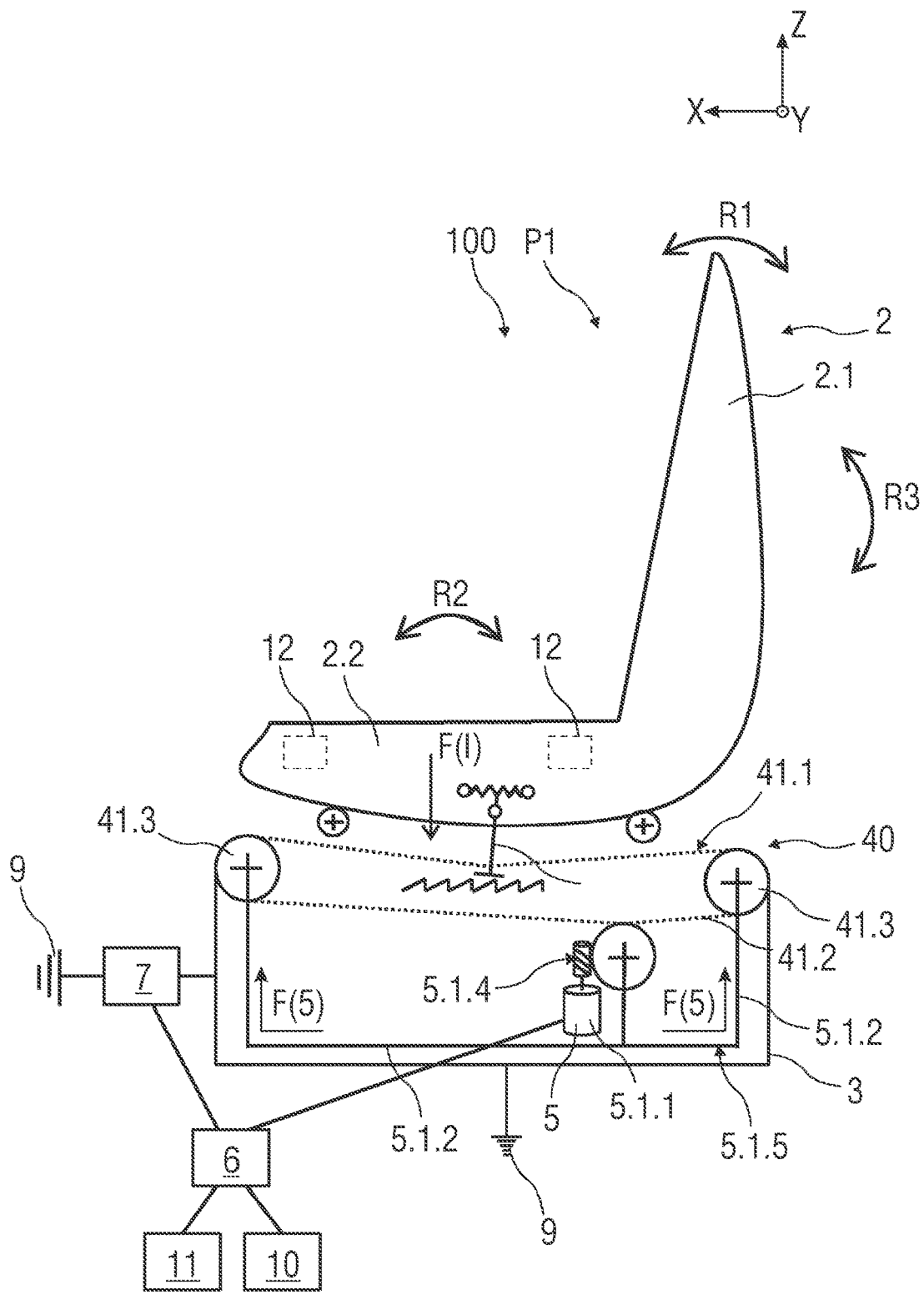

FIG. 13 shows a schematic view of a further embodiment of a seat assembly 100 with a freely adjustable seat shell 2 with self-locking drive unit 5.

The seat assembly 100 is configured in particular as a floating seat. Similarly to the seat assembly 1, the seat shell 2 comprises the seat surface region 2.2 and the backrest region 2.1 and the base element 3 on which the seat shell 2 is adjustably arranged.

Furthermore, the seat assembly 100 comprises an adjustment unit 40 for adjusting the seat shell 2 relative to the base element 3. In addition, the seat assembly 100 comprises the at least one self-locking drive unit 5.

The drive unit 5 is configured to lock the base element 3 and seat shell 2 in self-locking fashion, wherein the locking can be released both by a force F(I) introduced into the adjustment unit 40 via the seat shell 2 by an occupant sitting in the seat shell 2, and also by a force F(5) introduced into the adjustment unit 40 via the drive unit 5.

The seat shell 2 can thus be adjusted by an autonomous adjustment, by a shift in the center of gravity of the person sitting in the seat shell 2, and/or by a motorized adjustment by the drive unit 5 on the basis of a set or activated adjustment mode.

The seat shell 2 is configured as one piece or may for example comprise a seat surface and a backrest which are arranged fixedly relative to one another. The seat adjustment takes place in particular via a body movement of the occupant sitting in the seat shell 2. In contrast to previously known seat adjustment devices, adjustments about one or more adjustment axes are made not via manually operated input facilities but only via a shift in the center of gravity or support of the occupant against the seat shell 2, in particular the seat surface of the seat shell 2.

In addition, the seat shell 2 may also be adjustable without occupants. For example, the seat shell 2 may automatically be brought back into a "normal" starting position or seat position P1, or a position for easier entry/exit, in particular a tilted position (not shown in detail). Such an adjustment can be achieved not only when the seat or seat shell 2 is "empty" but also if an occupant is sitting in the seat shell 2. For example, a stored position, such as for example a seat position P1, may be resumed automatically.

The seat assembly 100 comprises a mechanical motorized adjustment which utilizes the principle of self-locking so that no separate locking device is required.

For this, at least one force sensor 7 is arranged in the force flow F between the adjustment mechanism 40 and the seat base 9.

The force sensor 7 is arranged and configured such that it measures the force F(1) or F(5) acting on the adjustment unit 40. For this, the force sensor 7 is coupled to the drive unit 5 such that the self-locking of the drive unit 5 is released or at least reduced when the adjustment mode is activated and a force F(1) is applied to the adjustment unit 40, for example because of a movement of the occupant in the seat shell 2. For example, for this the occupant has activated the adjustment mode of the seat assembly 100 by means of the activation unit 10 such that, because of a shift in the center of gravity or corresponding support of the occupant in the seat shell 2, the latter is automatically moved accordingly.

The control unit 6 is here coupled to the drive unit 5, the force sensor 7 and/or the activation unit 10. For example, the control unit 6 is coupled to the force sensor 7, the drive unit 5 and/or the activation unit 10 for signaling and/or control purposes.

During operation, for example an adjustment command by the occupant is determined via an input unit 11, for example a switch or a voice signal, and/or via the activation unit 10. By input of the adjustment command or an adjustment mode via the input unit 11, for example via a voice command or by actuation of a switch, in particular one of several adjustment modes can be activated. Alternatively or additionally, the seat assembly 100 may comprise, as an activation unit 10, several contact sensors 12, for example the sensors which are also used for detecting seat occupancy, in order to activate the adjustment mode. The adjustment command may, alternatively or additionally, also be determined with fewer sensors which detect the force component in the actuation direction of the drive unit 5 close to the drive.

In a possible embodiment, a float mode is activated, wherein the control unit 6 is configured, in activated float mode, to move the seat shell 2 such that this follows a body movement of an occupant sitting in the seat shell 2. Here, there is no locking of the seat shell 2 in an assumed seat position P1.

Alternatively, an adjustment mode may be activated wherein the control unit 6 is configured, in activated adjustment mode, to move the seat shell 2 such that this follows the body movement of an occupant sitting in the seat shell 2 into a desired seat position P1, and wherein the seat shell 2 is locked in the desired seat position P1, for example by means of self-locking of the drive unit 5.

In a further alternative, a driving comfort mode may be activated, wherein the control unit 6 is configured, in activated driving comfort mode, to adjust the seat shell 2 depending on momentary driving movements of the vehicle.

FIG. 13 shows the adjustment unit 40 which is configured as a cable-pull mechanism 41.1. For example, the cable-pull mechanism 41.1 is configured as an arcuate cable-pull with a circumferential cable 41.2.

The drive unit 5 comprises at least one gear motor unit. The gear motor unit is configured as a self-locking worm gear 5.1.4 with motor 5.1.1. A spindle of the worm gear 5.1.4 is coupled to the cable-pull mechanism 41.1 via a Bowden cable mechanism 5.1.5. The drive unit 5 here activates the Bowden cable mechanism 5.1.5, which actuates the cable 41.2 which acts on a carrier 13 coupled for movement purposes to the seat shell 2.

The cable 41.2 is coupled for movement purposes to the self-locking worm gear 5.1.4. For example, the cable 41.2 is held by means of two deflecting rollers 41.3, which are driven by the gear motor unit via Bowden cables 5.1.2 of the Bowden cable mechanism 5.1.5. In addition, the cable 41.2 is coupled to the carrier 13 which is attached to the seat shell 2.

If the carrier 13 substantially follows an arc or arc segment of the seat shell 2 and the cable 41.2 rests on the seat side on the arc segment, the adjustment unit 40 may be designed largely stiff since almost no length adjustment is necessary for the cable 41.2. The seat shell 2 is locked via the cable 41.2 and the self-locking of the worm gear 5.1.4. To adjust the seat shell 2, this can be adjusted by motor by activation of the motor 5.1.1.

Furthermore, the seat shell 2, in particular its associated adjustment unit 40, and the base element 3 and/or seat base 9 and the force sensor 7 arranged in between are actively coupled such that as a resulting force, the force F(I) introduced into the seat shell 2 by the occupant sitting in the seat shell 2 acts on the force sensor 7.

In order to measure the force F(I) introduced into the seat shell 2 by the occupant, the adjustment unit 40 with the cable-pull mechanism 14.1, the deflecting rollers 41.3 and the carrier 13, and the drive unit 5, are supported via the force sensor 7 against the seat base 9, for example a vehicle floor. By the arrangement of the force sensor 7 between the seat base 9 and the seat shell 2 with the components, such as the adjustment unit 40, deflecting rollers 41.3, carrier 13 and drive unit 5, mounted on a structural support such as a crossbar element 3.1 or carrier plate 3.2, it is ensured that a pretension of the cable 41.2 necessary to ensure absence of play is not superposed on the force measurement signal, but only resulting forces from the adjustment command act on the force sensor 7.

Figure 17:
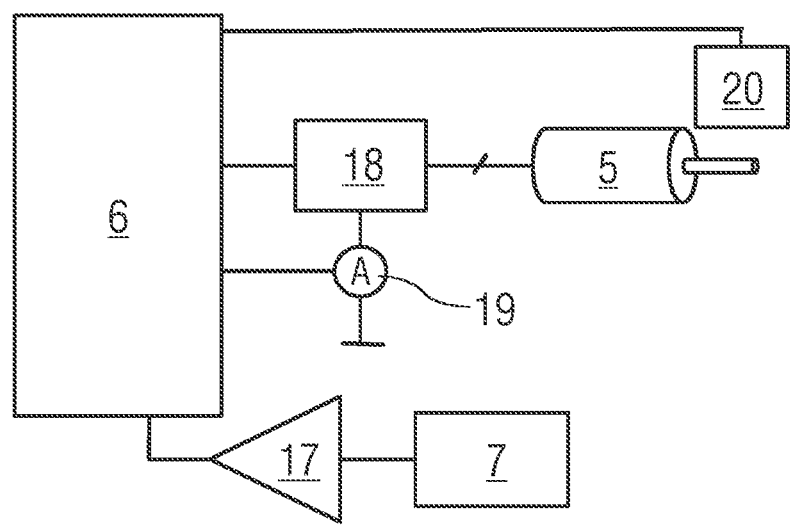

For this, the base element 3 as a carrier, with the adjustment unit 40 or drive unit 5, is mounted or arranged on the seat base 9 e.g. by means of support points 14 (shown in FIG. 17). In order to secure this singular point of force transmission, the adjustment unit 40 is mounted on the support points 14 such that the force component in the measurement direction is influenced as little as possible.

For this, a guidance of the cable 41.2 may be provided. The guidance of the cable 41.2 via the deflecting rollers 41.3, and the movement of the cable 41.2 via the Bowden cables 5.1.2, furthermore allow the drive unit 5 to be assigned to the base element 3 so that the seat shell 2 carries less weight. This also simplifies the electrical supply to the motor 5.1.1.

For the rotation of the seat shell 2 of the seat assembly 100 about the vertical axis Z, a separate adjustment device may be provided, such as for example the above-described adjustment unit 4.2 shown in FIGS. 1 to 6. A further alternative adjustment device for the adjustment about the vertical axis Z may for example be a further drive unit 5, 5.1 5.2, formed by a motor 5.1.1 and a worm gear, which is arranged directly without cable-pull mechanism 41.1 at the pivot point of the seat shell 2 or along an arc segment of the seat shell 2 with the pivot point as the center point, and is coupled to the seat shell 2, wherein a further force sensor 7 as a transmission element for tangentially acting forces is arranged between the adjustment device and the base element 3 and measures the tangentially acting forces (not shown in detail).

In addition, force threshold values may be parameterized and stored in the control unit 6, and taken into account on activation of the respective adjustment mechanism 4 or 40. Thanks to the possibility of parameterizing the force threshold values, the temporal behavior of the adjustment mechanism 4 or 40, and the translation factor of the force application and adjustment speed, the adjustment behavior of the seat assembly 1 or 100 may be adapted and modified. In particular, further sensors for location determination may allow the setting of location-dependent adjustment parameters.

In addition, a number of end stops 16 may be provided for limiting the adjustment movement of the seat shell 2 for both the seat assembly 1 and also for the seat assembly 100.

Furthermore, a trap-protection device based on seat environmental sensors may be provided for the respective seat assembly 1 or 100.

Also, environmental influences, such as for example vehicle acceleration or deceleration, may be taken into account, in particular compensated. For this, by means of the control unit 6, vehicle parameters such as vehicle acceleration or deceleration are determined and, accordingly, an adapted control signal generated for the respective drive unit 5, 5.1 and/or 5.2.

Figure 14:
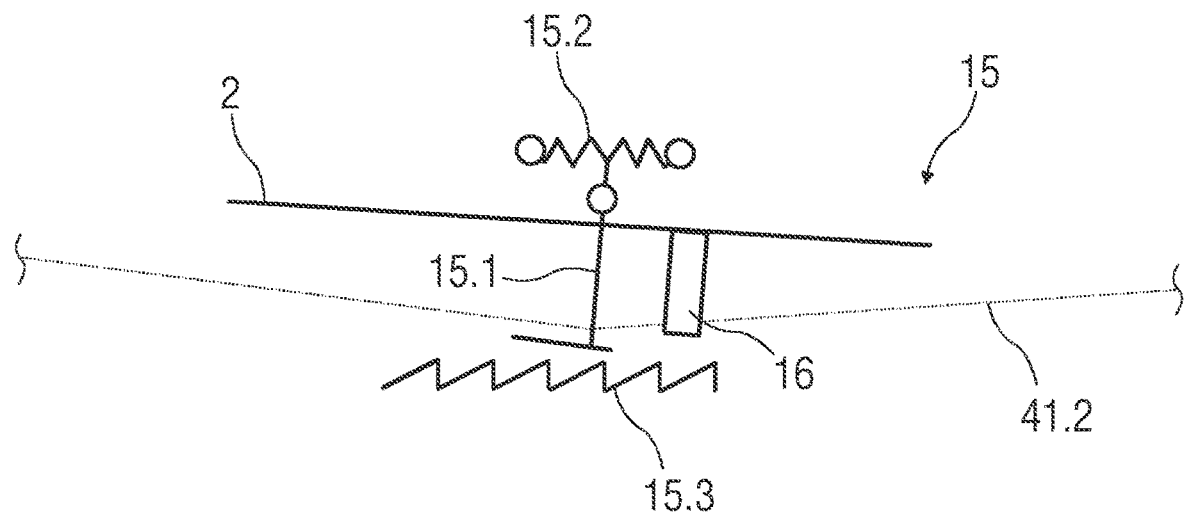
Figure 15:
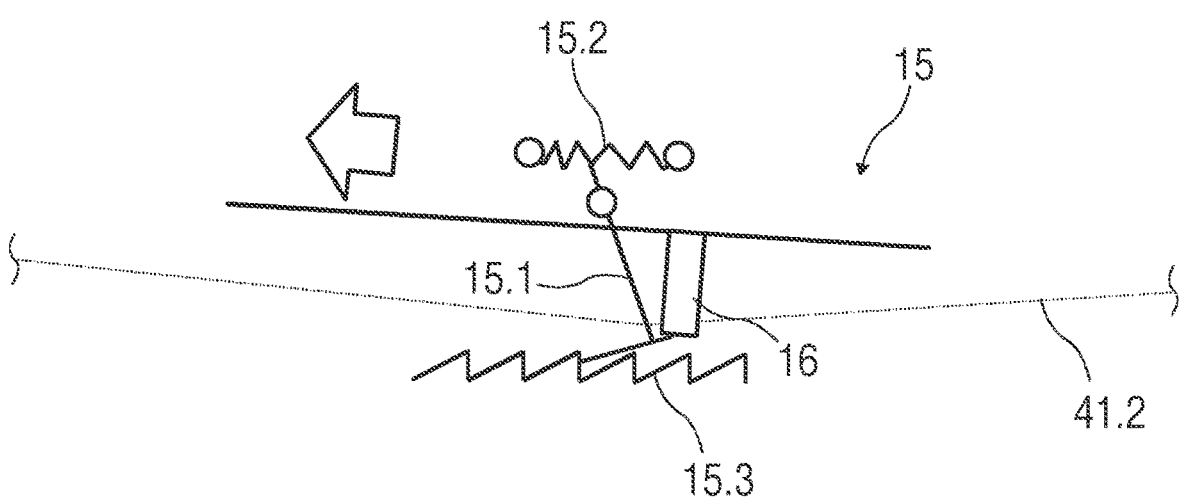

Also, the seat shell 2 may be provided with an overload protection 15 for absorbing overload forces, as shown in FIGS. 14 and 15.

FIG. 14 shows a schematic view of the overload protection 15 in unloaded state.

FIG. 15 shows a schematic view of the overload protection 15 in loaded state.

The overload protection 15 prevents high forces, e.g. resulting from an accident, having to be dissipated by the cable 41.2 and the self-locking drive unit 5 or 5.1, 5.2.

Such an overload protection 15 may be formed for example from at least one T-shaped lever 15.1, the foot point of which is pivotably mounted on the seat shell 2 by means of an in particular flexible hinge 15.2, for example a fabric or spring hinge. Alternatively, two T-shaped levers 15.1 which are connected together may also be provided (not shown in detail).

The cable 41.2, in particular the steel cable, is attached above the crossbeam of the T-shaped lever 15.1. A protective structure 15.3, in particular a braking or profile structure, for example an opposing sawtooth structure, corresponding to the lever 15.1, is arranged below the crossbeam of the lever 15.1.

In the unloaded state shown in FIG. 15, the crossbeam is placed above the protective structure 15.3 so that the seat shell 2 can be adjusted.

If excessive force is introduced, the crossbeam of the lever 15.1 comes into engagement with the protective structure 15.3, so that adjustment of the seat shell 2 is blocked.

In addition, an end stop 16 may be provided for limiting an adjustment movement of the seat shell 2.

Figure 16:
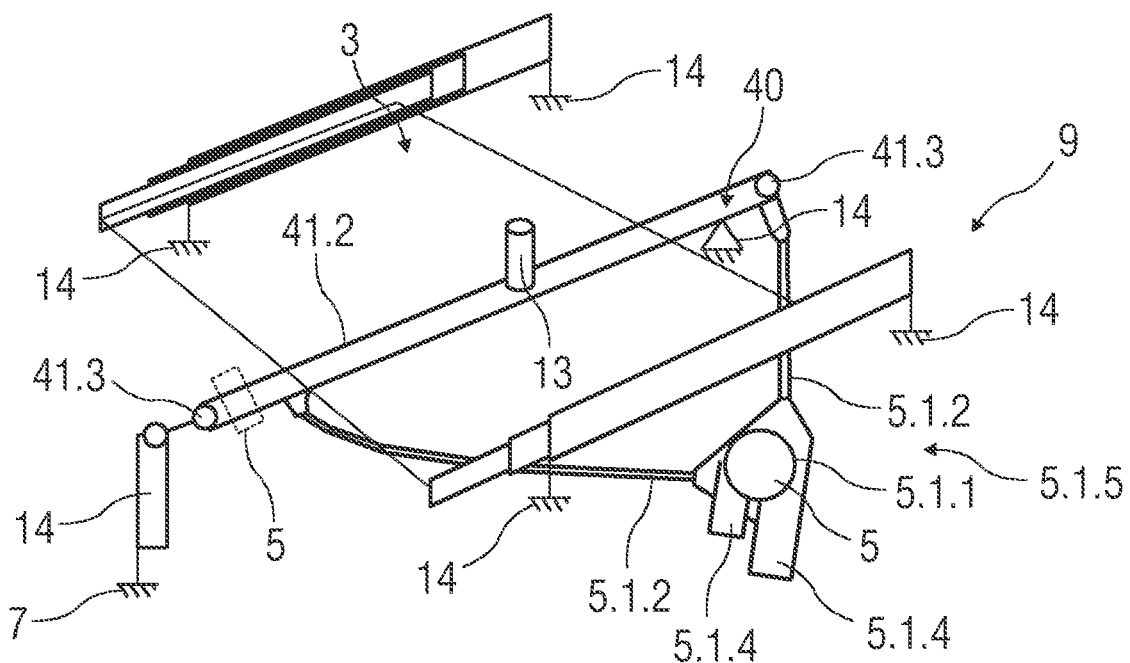

FIG. 16 shows a perspective view of the adjustment mechanism 40, with the adjustment unit 41 and coupled drive unit 5, which are assigned to the base element 3 and mounted by means of support points 14.

FIG. 17 shows schematically an embodiment of a coupling of the control unit 6, force sensor 7 and drive unit 5 for signaling and control purposes.

The signal from the force sensor 7 is amplified by means of a measurement amplifier 17 and supplied to the control unit 6 for generating an actuating signal for the drive unit 5. The actuating signal for the drive unit 5 is supplied via a bridge circuit 18, in particular an electronic H-bridge circuit, for actuation of the motor 5.1.1.

To control the motor 5.1.1, in addition measurement signals may be returned to the control unit 6 via a current meter 19 and a motor sensor 20, in particular a Hall effect sensor, for controlling the motor 5.1.1.

LIST OF REFERENCE SIGNS 1, 100 Seat assembly
2 Seat, seat shell
2.1 Backrest region
2.2 Seat surface region
2.3 Carrier
3 Base element
3.1 Crossbar element
3.2 Carrier plate
3.2.1 Passage opening
4, 4.1, 4.2, 40 Adjustment unit
4.1.1 Rail
4.1.2 Roller
4.1.3 End stop
4.1.4 Carrier element
4.1.5 Guide rail
4.1.6 Passage opening 4.2.1 Ring rail
4.2.2 Upper ring rail
4.2.3 Lower ring rail
4.2.4 Inner ring opening
41.1 Cable-pull mechanism
41.2 Cable
41.3 Deflecting roller
5 Drive unit
5.1, 5.2 Drive unit
5.1.1 Motor
5.1.2 Bowden cable
5.1.3 Force transmission element
5.1.4 Worm gear
5.1.5 Bowden cable mechanism
5.2.1 Motor
5.2.2 Bowden cable
6 Control unit
7.1, 7.2, 7 Force sensor
8 Length adjustment unit
9 Seat base
10 Activation unit
11 Input unit
12 Contact sensor
13 Carrier
14 Support point
15 Overload protection
15.1 Lever
15.2 Hinge
15.3 Protective structure
16 End stop
17 Measurement amplifier
18 Bridge circuit
19 Current meter
20 Motor sensor
F Force flow
F(I) Force introduced by occupant
F(5) Force introduced by drive unit
P1 Design or seat position
T1, T2 Translational degrees of freedom
R1, R2, R3 Rotational degrees of freedom
X Longitudinal axis
Y Transverse axis
Z Vertical axis
x Longitudinal direction

The invention claimed is:

1. A seat assembly, comprising:
    at least one seat with a seat surface region and a backrest region,
    a base element on which the seat is adjustably arranged,
    at least one adjustment unit for adjusting the seat relative to the base element and/or a seat base, and
    at least one drive unit,
wherein the drive unit is configured to lock the base element and the seat in a self-locking manner, and wherein the locking can be released both by a force (F(I)) introduced into the adjustment unit via the seat by an occupant sitting in the seat, and also by a force (F(5)) introduced into the adjustment unit by the drive unit, wherein at least one force sensor is arranged in the force flow between the seat and the seat base and/or the base element.

2. The seat assembly as claimed in claim 1, wherein a control unit is provided which is coupled to the drive unit, the force sensor and/or an activation unit.

3. The seat assembly as claimed in claim 2, wherein the activation unit is configured as an input unit and/or a contact sensor for activating an adjustment mode.

4. The seat assembly as claimed in claim 2, wherein the control unit is configured, in an activated float mode, to move the seat such that this follows a body movement of an occupant sitting in the seat.

5. The seat assembly as claimed in 2, wherein the control unit is configured, in an activated adjustment mode, to move the seat such that it follows the body movement of an occupant sitting in the seat into a desired seat position, and wherein the seat is locked in the desired seat position.

6. The seat assembly as claimed in claim 2, wherein the control unit is configured, in an activated driving comfort mode, to adjust the seat depending on momentary travel movements of the vehicle.

7. The seat assembly as claimed in claim 1, wherein the adjustment unit is designed to execute an adjustment movement of the seat relative to the base element and/or the seat base.

8. The seat assembly as claimed in claim 7, wherein the drive unit comprises at least one gear motor unit which is coupled to the adjustment unit.

9. The seat assembly as claimed in claim 7, wherein the drive unit actuates a Bowden cable mechanism or a spindle, which actuates a cable of the cable-pull mechanism or a rail of the adjustment unit which acts on a carrier coupled for movement purposes to the seat.

10. The seat assembly as claimed in claim 7, wherein the seat and the base element and the force sensor arranged in between are actively coupled such that as a resulting force, the force (F(I)) introduced by an occupant sitting in the seat acts on the force sensor.

11. The seat assembly as claimed in claim 1, wherein the adjustment unit is mounted on the seat base via support points.

12. The seat assembly as claimed in claim 1, wherein a number of end stops are provided to limit the adjustment movement of the seat.

13. The seat assembly as claimed in claim 1, wherein the seat is provided with an overload protection for absorbing overload forces, and/or a trap-protection device based on seat environment sensors.

14. The seat assembly as claimed in claim 1, wherein the seat is designed as a seat shell.

* * * * *